United States Patent [19]

Conger

[11] 4,083,781
[45] Apr. 11, 1978

[54] DESALINATION PROCESS SYSTEM AND BY-PRODUCT RECOVERY

[75] Inventor: Franklin E. Conger, Summit, N.J.

[73] Assignee: Stone & Webster Engineering Corporation, Boston, Mass.

[21] Appl. No.: 704,359

[22] Filed: Jul. 12, 1976

[51] Int. Cl.² ............................................. B01D 13/00
[52] U.S. Cl. .............................. 210/23 H; 210/433 M
[58] Field of Search ...................................... 210/23 H

[56] References Cited

U.S. PATENT DOCUMENTS

| 3,493,495 | 2/1970 | Mendelson | 210/23 H |
| 3,498,910 | 3/1970 | Mendelson | 210/23 H |
| 3,839,201 | 10/1974 | Miller | 210/23 H |
| 3,898,158 | 8/1975 | Miller | 210/23 H |

OTHER PUBLICATIONS

Desalination, vol. 11, 1972, pp. 217–254, published by Elsevier Publishing Co., Amsterdam.
Howe, Fundamentals of Water Desalination, vol. 1, 1974, published by Marcel Dekker, Inc., N. Y., pp. 56, 57, 74, 75, 325 and 326.
Lewis, College Chemistry, Barnes and Noble Books, N. Y., 1971, pp. 98, 183 and 185.

Primary Examiner—Leland A. Sebastian

[57] ABSTRACT

A desalination process system combining reverse osmosis, evaporation and brine concentration with by-product recovery.

4 Claims, 3 Drawing Figures

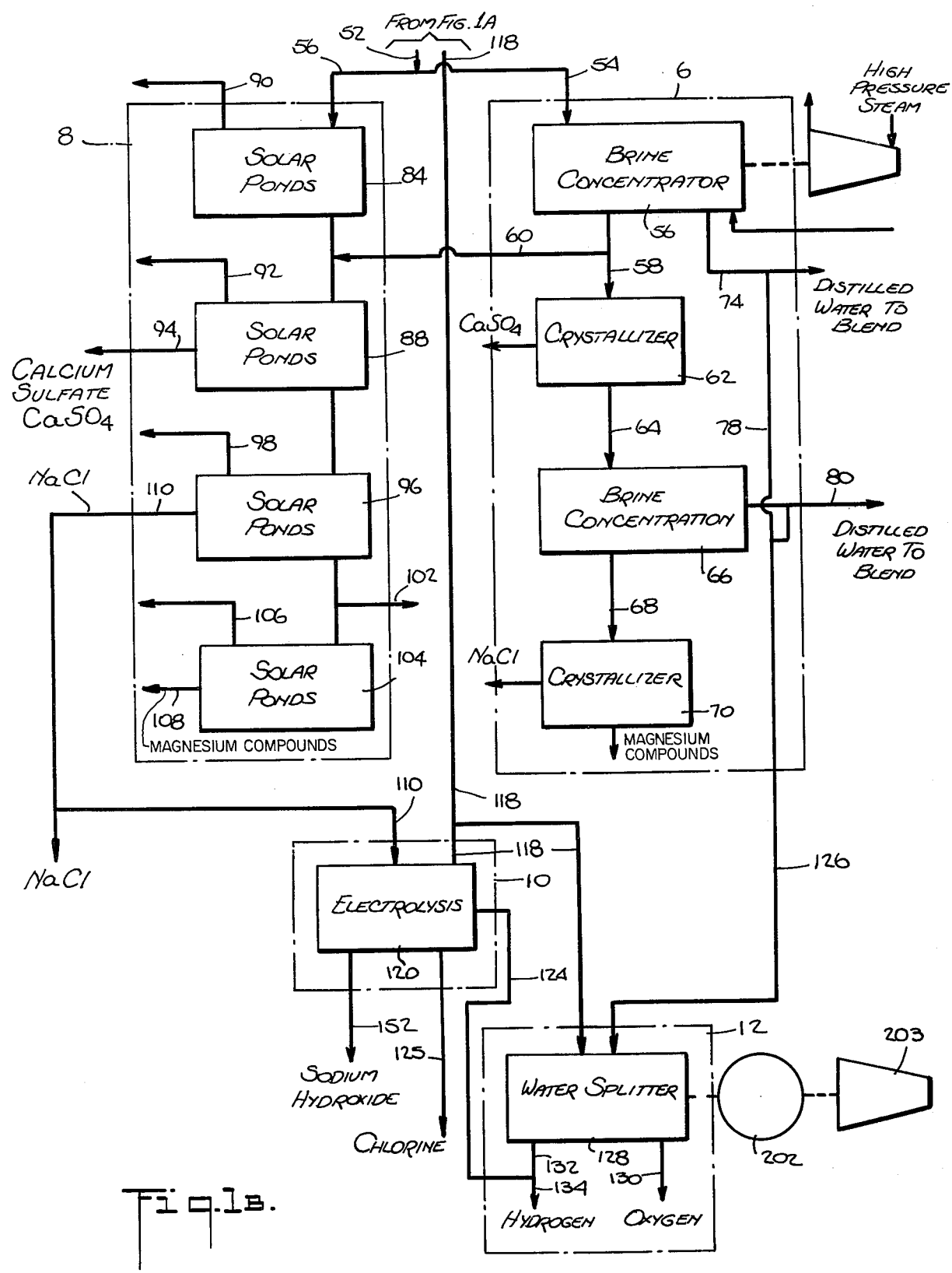

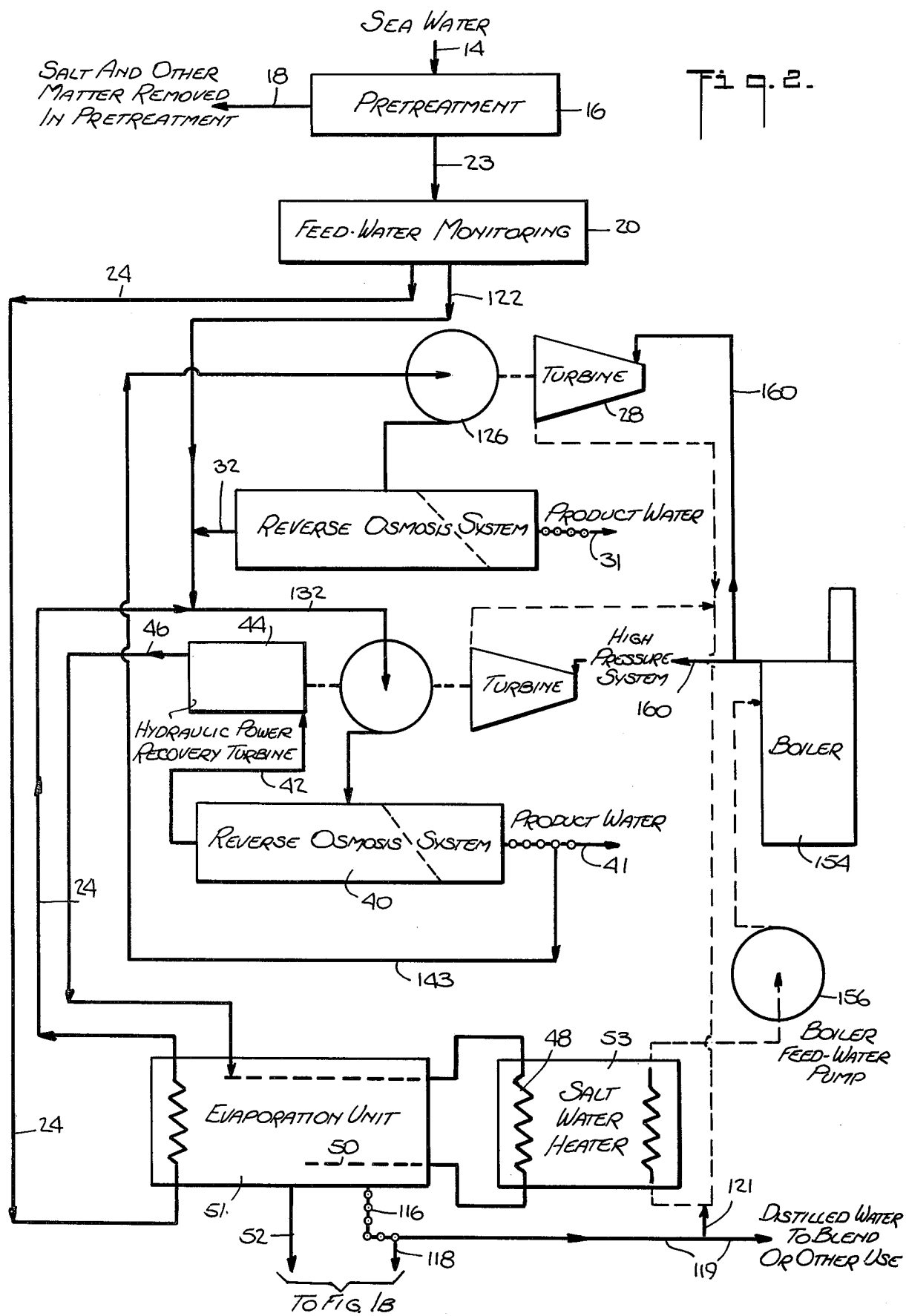

DESALINATION PROCESS SYSTEM AND BY-PRODUCT RECOVERY

FIELD OF THE INVENTION

This invention is directed to removal of salts from fluids. In particular, this invention is especially suitable for desalting sea water or brackish water. More specifically, the process is directed to using known desalination methods such as reverse osmosis, flash evaporation and brine concentration in combination to efficiently use the energy required for desalination and to use the desalination by-products to produce useful materials.

BACKGROUND OF THE INVENTION

DESCRIPTION OF THE PRIOR ART

The desire to produce potable or otherwise usable water from sea water and brackish water has existed for many years. Considerable technology now exists with the capability to purify sea water and brackish water, both of which may be referred to herein as "saline water" or as "salt water." One known technique of desalination is the reverse osmosis process which relies on the use of high pressure to force relatively salt-free water through membranes thereby separating relatively salt-free water from the initial saline water. Another known process is the evaporation process which requires heat to evaporate the water and thereby separate the water in the form of condensate from the saline water. In addition, brine concentrators such as Resources Conservation Co. brine concentrators (R.C.C. brine concentrators) are used to separate water and salt.

Each of these techniques relies on energy to provide the means for separating the water from the salt. For example, with some reverse osmosis membranes it is possible to obtain from sea water a reasonable yield of product water containing less than 500 ppm of dissolved salts. The salts contained in the saline water are substantially rejected by the membrane and are concentrated in a reject brine. The reverse osmosis process necessarily requires energy. The amount of energy required and the yield of product water produced from saline water are directly related to the salt concentration of the saline water being processed and, within limits, to the temperature of the saline water. In general, reverse osmosis units operate less efficiently and require more energy per unit of water product as the salt concentration of the saline water feed increases. In fact, at very high salt concentrations reverse osmosis should not be employed. However, energy costs are a major factor in determining whether a desalting facility is or is not economic.

On the other hand, the energy required to produce water from sea water by multi-stage flash distillation, which inherently produces water of about 10 ppm of dissolved salts, is much greater than that required to produce the same amount of water by reverse osmosis. However, multi-stage flash distillation can process saline water of higher salt content than can be effectively processed by reverse osmosis. Within its zone of capability multi-flash distillation requires approximately the same amount of energy per unit of distillate water product whether the salt content of the feed water is low or high. Thus as the salt content of the feed water decreases, more product water of 500 ppm salt content can be obtained by blending more and more saline feed water with a given quantity of distillate.

Efforts have been made to combine desalination systems and rely on combinations of desalination processes to make an efficient and economically acceptable system. One such system is shown in U.S. Pat. No. 3,632,505 (Nelson, Jan. 4, 1972). The system disclosed therein relies basically on arranging reverse osmosis and flash evaporation units essentially in parallel. High-pressure steam turbines provide the pressure for the reverse osmosis system and the high-pressure turbine discharge is used to provide the heat for the evaporation units.

Attempts have also been made to recover by-products from the desalination of brackish water. As set forth in the Fourth International Symposium on Salt — Northern Ohio Geological Society a process is outlined for the partial deionization of brine to produce by-products such as sodium carbonate and calcium chloride and waste such as calcium sulfate, calcium carbonate and magnesium oxide.

SUMMARY OF THE INVENTION

The present invention is directed to combining known desalination techniques to afford efficient energy usage and may simultaneously provide by-products which are useful.

Further, the process of the present invention facilitates spreading the energy cost of desalination over a greater number and quantity of marketable products.

The system of the present invention relies essentially on a multi-stage reverse osmosis installation in series with a conventional flash evaporation unit and optionally a brine concentrator.

When processing brackish water, the water to be desalinated is delivered to the first reverse osmosis sub-system, which is a moderate pressure sub-system, by a pump driven by a stream turbine. After passage of the water through the first reverse osmosis sub-system (consisting of one or more stages), both usable product water and salt water of much higher salt content than the saline water entering the reverse osmosis system are provided. The reject salt water from the first reverse osmosis sub-system is delivered under a higher pressure by a turbine-driven pump to a second reverse osmosis sub-system, which is a high-pressure sub-system, (consisting of one or more stages). The turbine drive of the pumps for the second reverse osmosis stage system is driven by steam. High-pressure steam in the range of 1,000 psia to 2,300 psia at approximately 1200° F. or intermediate pressure steam in the range of 400 psia to 1,000 psia at approximately 900° F. may be used to drive the turbine providing the motive force for the reverse osmosis feed system pumps. Some or all of the steam exhausted from the turbines should be at a high enough pressure to provide the heat required by the evaporation unit or units. Again in the second reverse osmosis system, both usable product water and high-salt content water are produced. When processing sea water, the sea water is first delivered to the high-pressure reverse osmosis sub-system and the product water rather than the reject water is delivered to the moderate pressure reverse osmosis sub-system. The high-salt content water is delivered to the evaporation unit for further treatment. Therein distilled water is recovered by flash evaporation and the high-salt content product remaining is delivered for further processing to either concentration ponds (solar ponds) or to mechanical brine concentrators, or, selectively, to both.

The solar ponds treat the portion of the high-salt content stream to recover calcium sulfate and sodium chloride. The brine concentrators treat the high-salt content stream to produce additional distilled water by removing the salt from the system and incidently recover calcium sulfate and sodium chloride and other products.

The process may also produce hydrogen, chlorine and sodium hydroxide by dissolving the recovered sodium chloride in some of the distilled water from the flash evaporation and/or from the brine concentrator units and subjecting the resulting solution to electrolysis. Further, distilled water from the brine concentrator may be delivered to a water splitter which produces hydrogen and oxygen provided suitable sources of energy are available.

DESCRIPTION OF THE DRAWINGS

The invention will be better understood when the following drawings are considered with the detailed description of the preferred embodiment.

FIG. 2 is a drawing of a system of the preferred embodiment particularly adapted for the treatment of sea water.

DESCRIPTION OF THE PREFERRED EMBODIMENT

Figure 1A:
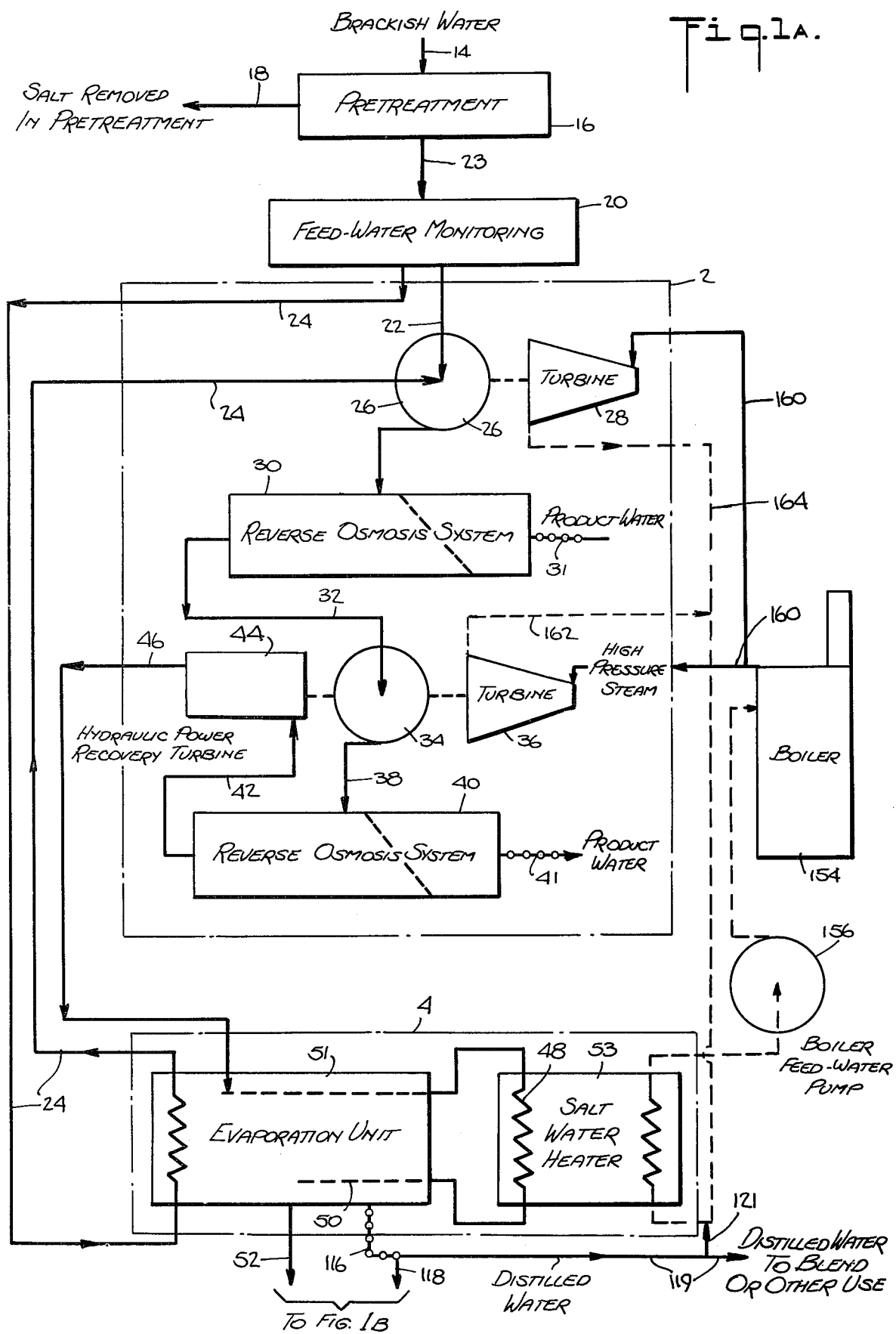
FIG. 1 is a drawing of a system of the preferred embodiment particularly adapted for the treatment of brackish water.

The desalination system as shown in the preferred embodiment is directed to maximizing recovery of usable product water and to obtaining a maximum value of by-products recovery when consuming a fixed amount of energy. The desalination system of the preferred embodiment consists essentially of a reverse osmosis system 2, an evaporation unit 4, a brine concentration unit 6, concentration ponds 8, means for electrolyzing brine 10 and water splitting means 12. High-pressure steam generation boiler 154 is afforded to provide high-pressure steam for the system.

As best seen in FIG. 1, saline water is delivered to the system through line 14 and pretreated in pretreatment unit 16. The pretreatment necessary is a function of the saline water being treated. Illustrative of the pretreatment processes available for use prior to reverse osmosis are shock chlorination, coagulation, screening filtration with sand followed by diatomaceous earth, carbon filtration to remove chlorine and pH adjustment.

The solids and other matter separated from the water by the pretreatment unit 16 are discharged through line 18. The treated water is then passed in line 23 through feed-water monitoring and valving devices 20. The treated water is then passed in two branches, lines 22 and lines 24; the water from line 22 is delivered directly to a pump 26, while the water from line 24 is circulated through the evaporation unit 4 in heat exchange relationship to provide cooling which is useful for condensing purposes in the evaporation unit and to recover heat. The water from lines 22 and 24 join at pump 26 where the composite water temperature is 80° to 95° F. Elevation of the temperature of the saline water to temperatures in this range prior to entry into the first reverse osmosis sub-system 30 facilitates a higher rate of flow through the membranes of the reverse osmosis sub-system 30 than would be the case with saline water at lower temperatures, e.g., 62° F.

When the saline water being processed is brackish water, the pump 26 elevates the water from lines 22 and 24 to pressures in the range of 400 psig for delivery to the first reverse osmosis sub-system 30. The pump 26 is driven by a steam turbine 28. For this purpose, high-pressure steam in the range of 1,000 to 2,300 psia at approximately 1,200° F. or intermediate pressure steam in the range of 400 to 1,000 psia at approximately 900° F. may be used.

The reverse osmosis sub-system 30 of the reverse osmosis system 2 is conventional such as duPont PERMASEP B-9 Permeators. Thus, with brackish water of 3,200 ppm at 80° to 95° F. and at pressures of 400 psig, conversion is effected of 50 to 75% of the brackish water to fresh product water having a salt content of 300 to 500 ppm. The remaining 25 to 50% of the water, sometimes called reject water, carries most of the salt for further processing.

In practice, to obtain the desired conversion water, Permeators in the reverse osmosis sub-system 30 are piped to operate in two or more stages or series. Thus, within the medium pressure reverse osmosis sub-system 30, a series operation is used. In the series operation, reject from the first stage of the sub-system is fed directly into a second stage of the first sub-system. The product from both stages of the first sub-system is then combined.

In the system of the present invention, the product water is taken from the system through line 31 and ultimately either used without further treatment or blended with product water from other units of the system. The reject water is of higher salt content than the water entering reverse osmosis sub-system 30 and is pumped through lines 32 and 38 by pump 34 to a second reverse osmosis sub-system 40. The temperature of the reject water is in the range of 80° to 95° F., having been previously heated to that temperature while in line 24 prior to the first reverse osmosis system; thus this is another way in which energy is conserved in the system of the present invention. The second reverse osmosis sub-system 40 is a high-pressure reverse osmosis sub-system through which is passed saline water having a higher salt content than the saline water which entered the first reverse osmosis sub-system 30. The drive for pump 34 is provided by a high-pressure steam turbine 36 and additionally by a hydraulic power recovery turbine 44 driven by the reject from the reverse osmosis system 40. A reverse osmosis process virtually the same as previously described is repeated in reverse osmosis system 40 at a pressure in the range of 800 psig. Steam at 1,000 to 2,300 psia and approximately 1,200° F. or at approximately 400 to 1000 psia and approximately 900° F. drives turbine 36. However, the reverse osmosis sub-system 40 is provided with a high-pressure membrane such as duPont PERMASEP B-10 Permeator piped to operate in two or more stages or series. Product water is taken from the sub-system through line 41 to be blended or it may be recycled to the moderate pressure reverse osmosis sub-system 30. As to the product water that flows through the membrane of the B-10 reverse osmosis sub-system 40 modules, as high as 99% of the salts are rejected by the membrane and such salts are concentrated in a reject brine which flows along the outside of the bundle of membranes and then exits from the Permeator. Approximately 30% of the water entering the reverse osmosis sub-system 40 is converted to product water having 400 to 500 ppm of salt.

In FIG. 2 the desalination system of the preferred embodiment is shown adapted for treatment of sea water. As in FIG. 1, like reference characters refer to like equipment. Thus, the system of FIG. 2 is essentially the same as the system of FIG. 1 except that the feed sea water is delivered first to the high-pressure reverse osmosis sub-system 40 and a portion of the product water from the high-pressure reverse osmosis sub-system 40 is delivered to the medium-pressure reverse osmosis sub-system 30. A portion of the sea water is delivered from the feed water monitoring system 20 through line 24 and passed in heat exchange relationship through the evaporation unit 51 to absorb heat. The remainder of the sea water leaving the feed water monitoring system 20 is passed through line 122 to mix with the heated sea water in line 24. In practice, the composite temperature of the sea water in line 132 is 80°–95°F. Sea water is pumped by pump 34 through reverse osmosis sub-system 40 at a pressure in the range of 800 psig to pass through the high-pressure membrane such as duPont PERMASEP B-10 Permeator. A portion of the product water leaving high-pressure reverse osmosis sub-system 40 through line 41 is taken through branch line 143 and pumped through medium-pressure reverse osmosis sub-system 30 by pump 26 at pressures in the range of 400 psig. Product water from the reverse osmosis sub-system 30 is taken through line 31 and the rejected water is passed through line 32 to mix with the sea water being pumped through high-pressure reverse osmosis sub-system 40.

The residue or reject brine which is high-salt content water, leaves the reverse osmosis sub-system 40 under pressure and passes through line 42 to the hydraulic power recovery turbine 44 where energy is recovered. After the high-salt content water passes through the power recovery turbine 44, the reject water is delivered through line 46 to the evaporation unit 4. The evaporation unit 4 is conventional, such as a multi-stage flash evaporator or a multiple effect evaporator or long tube evaporator. The multi-stage flash evaporator 4 consists basically of an evaporation section 51 and heater section 53. The flash distillation section is followed by compression distillation apparatus. The high-salt content water passes through the evaporation section 51 of the evaporation unit 4 to the heater section 53. In the heater section 53, low-pressure steam exhausting from turbines 28 and 36 is used to maintain the temperature of the effects or stages of the evaporation system at descending temperatures ranging from approximately 225° to 140°F. Line 164 and line 162 are arranged to convey the exhaust steam discharging from turbines 28 and 36 at about 25 psig and about 270 °F. in indirect heat exchange ralationship with the high-salt content water in line 46. Coil 48 is formed in line 46 to absorb heat from the low-pressure steam lines 162 and 164 at the evaporator unit heater 53. The heated salt water passes from the heater section 53 to the evaporation section 51 where it is vaporized on trays 50 and the vapor recovered as distilled water having a salt content of only about 5–10 ppm. The distilled water is removed from the evaporation section 51 through line 116. Distilled water is (a) taken from the system as a product through line 119, and/or (b) blended with product water from line 31 and/or 41, and/or (c) used in part to pass through line 121 to become boiler feed water and/or (d) pass through line 118 to the electrolysis unit 120 and/or the water splitter 128.

The blowdown brine of 54,000 ppm leaves the evaporation unit 51 through line 52 and is then delivered either entirely through line 54 to a brine concentration unit 6, consisting of one or more modules, or separated into lines 54 and 56 for partial distribution to both the brine concentration unit 6 and condensation ponds 8.

The brine concentration unit 6 is comprised essentially of a brine concentrator 56, a conventional crystallizer or grainer 62, a second brine concentrator 66 and a second conventional crystallizer or grainer 70, all arranged in series. The brine concentrators 56 and 66 are conventional, such as Resources Conservation Co. R.C.C. 225T which is a vapor-compression evaporative system capable of taking brines into a slurry without scaling. In essence, distilled water is taken from the system at each brine concentrator and calcium sulfate and sodium chloride are removed respectively at the crystallizer or grainer units 62 and 70. In the brine concentrator system 6, the brine to be treated is initially fed into a feed tank for a five to ten minute residence time for acid treatment. The acidified feed is then pumped through a heat exchanger which raises the temperature of the incoming flow to the boiling point. After the water passes through a noncondensible gas stripper, the brine enters the evaporator sump. Brine from the sump is pumped to the top of the heat-transfer tubes where it is released to fall as a film inside of the tubes. A portion of this falling film is vaporized. The vapor is then compressed in a vapor-compression thermodynamic cycle, and introduced to the shell side of the tube bundle where the temperature differential between the vapor and the brine film causes the vapor to condense as pure water. The concentrated brine slurry is continuously withdrawn from the sump at a sulfate stage of concentration to recover sulfate and finally withdrawn for final dehydration.

High-pressure steam at 1,000 to 2,300 psia and approximately 1,200 °F. or moderate pressure at approximately 400–1000 psia and 900 °F. from the boiler 154 is used to drive the compressor of the brine concentrator 56. Either steam or power from another source is used to drive the pumps of the brine concentrator 56.

Distilled water is taken from the system through line 74 while the high-salt content water is passed through line 58 for further treatment to recover calcium sulfate and salt.

Brine from the crystallizer or grainer 62 is directed through line 64 to a second brine concentrator 66 which is similar in design to the brine concentrator 56. Again, distilled water is recovered from the brine concentrator 66 through line 80. In the process of this invention approximately 90% of the water entering the brine concentrator 56 is recovered as distilled water through lines 74 and 80.

Alternatively, the high-content salt water leaving the brine concentrator 56 is directed through line 60 to the concentration pond system 8 where calcium sulfate and sodium chloride and magnesium compounds are recovered from the brine.

The concentration pond system 8 is comprised of solar ponds 84, 88, 96 and 104 arranged in series. The solar ponds 84, 88, 96 and 104 are conventional and function to evaporate water to the atmosphere and recover the residue. Although variations exist in this preferred embodiment, calcium sulfate is recovered in solar ponds 88 and removed from the system through line 94. The sodium chloride is recovered from solar ponds 96 and taken through line 10. In the final solar ponds 104, magnesium compounds are recovered and taken from the system through line 108. The brine taken from solar pond 96 can optionally be discarded through line 102.

Sodium chloride from crystallizer 70 or solar pond 96 and distilled water from line 118 are combined in the electrolysis unit 120 to provide a salt water solution particularly well suited for electrolysis. The Hooker Chlor-Alkali Systems using Hooker diaphragm cells use as raw materials:

salt:1.76 short tons/short ton $Cl_2$
98% $H_2SO_4$:13 lbs/short ton $Cl_2$ and employ a cell liquor composition of:

160.0:grams of caustic per liter
1.16:salt/caustic ratio
0.01:sodium chlorate %
185.6:grams of NaCl per liter In the electrolysis unit 120 hydrogen, line 124, and chlorine, line 125, and sodium hydroxide, line 152, are recovered as products. The electricity to run the electrolysis is purchased power or is electricity provided by a generator which is driven by high-pressure steam delivered to a generator turbine from steam line 160. Steam at 1,000 to 2,300 psia and approximately 1,200 °F. drives an electric generator.

The power consumption of the Hooker System amounts to approximately 2900 KWH of alternating current per short ton of chlorine for the cells only and for 3150 KWH of alternating current per short ton of chlorine for the complete chlorine plant.

Distilled water from either line 116 or line 126 or line 118 is delivered to a conventional water splitter 128 wherein additional hydrogen is recovered through line 132 and oxygen is taken from the system through line 130.

The electrical energy required to effect the water splitting by conventional electrolysis is provided by generator 202. A water splitter of the Westinghouse hybrid electrolysis thermo-chemical process (described in the Record of the Tenth Intersociety Energy Conversion Engineering Conference held at the University of Delaware, Aug. 18–22, 1975, pages 1200 to 1202) is particularly well suited for use in the system. The Westinghouse process uses electrical energy, thermal energy and chemical reaction to decompose water into hydrogen and oxygen and involves sulfur oxides as recycling intermediates. Although electrical power is required in the electrolyzer, much smaller quantities of electric power are needed than those necessary in conventional electrolysis. The hydrogen from line 132 and line 124 is delivered through line 134.

The energy for the system is provided by a boiler 154 which may be fired by any conventional fuel, including hydrogen from the system. The boiler heats water to a temperature of approximately 1,200 °F. and a pressure in the range of 1,000 to 2,300 psia. The high-pressure steam is passed through line 160 to all three of high-pressure steam turbine 36, high-pressure steam turbine 28, and high-pressure turbine 72 wherein the energy to drive pump 34, pump 26 and the brine concentrator 56 is provided respectively. The steam leaving turbine 28 and turbine 36 is low-pressure steam of about 270 °F. and about 25 psig. This low-pressure steam is taken through line 164 to the heater section 53 of the evaporation unit 4. There the steam is passed in heat exchange relationship with brine to provide the heat necessary to effect evaporation in the unit 4.

I claim:

1. A process for removing salts from salt-containing fluids and producing product water containing no more than about 500 ppm of salt therefrom comprising the steps of
   (a) placing the salt-containing fluid at an elevated temperature in the range of about 80° to 95 °F,
   (b) pumping the salt-containing fluid at the elevated temperature to a first reverse osmosis system operated at an elevated pressure.
   (c) withdrawing the product water from the first reverse osmosis system,
   (d) delivering reject salt-containing solution from the first reverse osmosis system to a second reverse osmosis system, said second system being operated at a much higher pressure than said first reverse osmosis system,
   (e) withdrawing the product water from the second reverse osmosis system,
   (f) delivering reject water from the second reverse osmosis system to an evaporation unit, and
   (g) withdrawing the desired product water from the evaporation unit.

2. A process in accordance with claim 1, wherein the salt-containing fluid is sea water and the first reverse osmosis system is operated at a much higher pressure than the elevated pressure at which the second reverse osmosis system is operated.

3. A process in accordance with claim 2, wherein the first reverse osmosis system is operated in the range of 800 psig and the second reverse osmosis system is operated in the range of 400 psig.

4. A process as in claim 1 wherein the first reverse osmosis system is operated in the range of 400 psig and the second reverse osmosis system is operated at 800 psig.

* * * * *